(12) United States Patent
Candelore (10) Patent No.: US 6,912,513 B1
(45) Date of Patent: Jun. 28, 2005

(54) COPY-PROTECTING MANAGEMENT USING A USER SCRAMBLING KEY

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/430,043

(22) Filed: Oct. 29, 1999

(51) Int. Cl.[7] ............................................. G06F 17/60
(52) U.S. Cl. .................. 705/51; 380/200; 380/223; 380/241; 380/44; 725/25; 725/30
(58) Field of Search .............................. 725/25, 27, 29, 725/30, 31; 380/200, 201, 202, 210, 211, 223, 226, 239, 241, 278, 44; 705/51, 57, 58

(56) References Cited

U.S. PATENT DOCUMENTS

| | | | | |
|---|---|---|---|---|
| 4,634,808 A | * | 1/1987 | Moerder | 380/29 |
| 4,757,534 A | * | 7/1988 | Matyas et al. | 380/25 |
| 4,785,361 A | | 11/1988 | Brotby | |
| 4,887,296 A | * | 12/1989 | Horne | 380/239 |
| 4,995,080 A | * | 2/1991 | Bestler et al. | 380/239 |
| 5,018,197 A | * | 5/1991 | Jones et al. | 380/239 |
| 5,138,659 A | | 8/1992 | Kelkar et al. | |
| 5,144,662 A | | 9/1992 | Welmer | |
| 5,325,432 A | * | 6/1994 | Gardeck et al. | 380/273 |
| 5,420,866 A | * | 5/1995 | Wasilewski | 370/426 |
| 5,473,692 A | | 12/1995 | Davis | |
| 5,485,577 A | | 1/1996 | Eyer et al. | |
| 5,539,828 A | * | 7/1996 | Davis | 380/30 |
| 5,568,552 A | | 10/1996 | Davis | |
| 5,574,787 A | * | 11/1996 | Ryan | |
| 5,608,448 A | * | 3/1997 | Smoral et al. | 725/92 |
| 5,615,265 A | | 3/1997 | Coutrot | |
| 5,652,795 A | | 7/1997 | Dillon et al. | |
| 5,666,293 A | | 9/1997 | Metz et al. | |
| 5,732,346 A | * | 3/1998 | Lazaridis et al. | 455/406 |
| 5,751,813 A | * | 5/1998 | Dorenbos | 713/153 |
| 5,757,909 A | * | 5/1998 | Park | |
| 5,768,539 A | | 6/1998 | Metz et al. | |
| 5,796,824 A | * | 8/1998 | Hasebe et al. | 380/4 |
| 5,796,829 A | | 8/1998 | Newby et al. | |
| 5,796,840 A | | 8/1998 | Davis | |
| 5,802,176 A | | 9/1998 | Audebert | |
| 5,805,712 A | | 9/1998 | Davis | |
| 5,839,823 A | * | 11/1998 | Hou et al. | 362/327 |
| 5,850,218 A | | 12/1998 | LaJoie et al. | |
| 5,852,290 A | * | 12/1998 | Chaney | 235/492 |
| 5,894,516 A | * | 4/1999 | Brandenburg | 705/51 |

(Continued)

FOREIGN PATENT DOCUMENTS

| | | | |
|---|---|---|---|
| JP | 411243534 A | * | 9/1999 |
| JP | 2000350181 | * | 12/2000 |

OTHER PUBLICATIONS

Axner, David H., "Security Devices Prevent the Compromise of Network Resources", Networking Management, vol. 8, No. 2, p. 56, Feb. 1990.*

Anonymous, "Oxford University Press To Sell And Distribute Textbooks Online", Electronic Education Report, vol. 4, No. 1, Jan. 8, 1997.*

Primary Examiner—John W. Hayes
(74) Attorney, Agent, or Firm—Blakely, Sokoloff, Taylor & Zafman LLP (57) ABSTRACT

The present invention is a method and apparatus for providing copy protection for a content. A descrambler descrambles the content delivered by a content provider using a local key. A key generator is coupled to the descrambler to generate the local key from a programmable user key according to an authorization code provided by the content provider.

20 Claims, 6 Drawing Sheets

U.S. PATENT DOCUMENTS

| | | | | |
|---|---|---|---|---|
| 5,915,018 A | * | 6/1999 | Aucsmith | 380/201 |
| 5,917,915 A | * | 6/1999 | Hirose | 380/228 |
| 5,949,877 A | | 9/1999 | Traw et al. | |
| 5,949,881 A | | 9/1999 | Davis | |
| 5,982,892 A | * | 11/1999 | Hicks et al. | 705/51 |
| 6,021,201 A | | 2/2000 | Bakhle et al. | |
| 6,028,932 A | | 2/2000 | Park | |
| 6,061,451 A | * | 5/2000 | Hirofumi | |
| 6,069,647 A | | 5/2000 | Sullivan et al. | |
| 6,069,957 A | * | 5/2000 | Richards | 380/281 |
| 6,088,450 A | | 7/2000 | Davis et al. | |
| 6,105,134 A | | 8/2000 | Pinder et al. | |
| 6,118,873 A | * | 9/2000 | Lotspiech et al. | 380/277 |
| 6,134,551 A | | 10/2000 | Aucsmith | |
| 6,154,206 A | * | 11/2000 | Ludtke | |
| 6,157,719 A | | 12/2000 | Wasilewski et al. | |
| 6,185,546 B1 | | 2/2001 | Davis | |
| 6,189,096 B1 | | 2/2001 | Haverty | |
| 6,192,131 B1 | | 2/2001 | Geer et al. | |
| 6,199,053 B1 | | 3/2001 | Herbert et al. | |
| 6,209,098 B1 | | 3/2001 | Davis | |
| 6,226,618 B1 | * | 5/2001 | Downs et al. | 380/279 |
| 6,229,895 B1 | * | 5/2001 | Son et al. | 380/200 |
| 6,230,194 B1 | | 5/2001 | Frailong et al. | |
| 6,230,266 B1 | | 5/2001 | Perlman et al. | |
| 6,256,747 B1 | | 7/2001 | Inohara et al. | |
| 6,263,506 B1 | * | 7/2001 | Ezaki et al. | |
| 6,266,416 B1 | * | 7/2001 | Sigbjornsen et al. | |
| 6,266,480 B1 | * | 7/2001 | Ezaki et al. | |
| 6,272,538 B1 | | 8/2001 | Holden et al. | |
| 6,282,649 B1 | * | 8/2001 | Lambert et al. | 713/167 |
| 6,292,568 B1 | * | 9/2001 | Akins et al. | 380/239 |
| 6,292,892 B1 | | 9/2001 | Davis | |
| 6,307,937 B1 | * | 10/2001 | Dillon et al. | 380/43 |
| 6,314,425 B1 | * | 11/2001 | Serbinis et al. | 707/10 |
| 6,351,538 B1 | * | 2/2002 | Uz | |
| 6,351,813 B1 | * | 2/2002 | Mooney et al. | 713/185 |
| 6,367,016 B1 | * | 4/2002 | Lambert et al. | 713/185 |
| 6,389,533 B1 | | 5/2002 | Davis et al. | |
| 6,389,537 B1 | | 5/2002 | Davis et al. | |
| 6,516,412 B2 | * | 2/2003 | Wasilewski et al. | 713/168 |
| 6,587,561 B1 | * | 7/2003 | Sered et al. | 380/241 |

* cited by examiner

COPY-PROTECTING MANAGEMENT USING A USER SCRAMBLING KEY

BACKGROUND

1. Field of the Invention

The present invention is related to copy protection. In particular, the present invention is related to copy protection using scrambling keys.

2. Description of Related Art

Copy protection management provides mechanisms to prevent unauthorized copying of clear content. In a typical scenario, a content provider supplies a content to a user via a medium. The medium may be a communication medium such as air, a communication network, or a hardware device, e.g. DVD disk, embodying the content. The content is scrambled by the content provider in a certain way. The scrambled content is then delivered the user's reader or viewing device. The user's reader or viewing device unscrambles the scrambled digital content and provides the content in the clear for viewing reading, or listening. The clear digital content would typically have copy protection applied to it such as Digital Transmission Copy Protection (DTCP) or watermarking. The copy protection, for example, could limit copying of the clear content to "Copy Never" or "Copy Once".

Conditional access (CA) devices are those user's viewing, reading, or listening devices that provide conditional access to the content. Entitlement management messages (EMM) typically use unique keys or signatures to deliver privileges (e.g., rights, keys) to a particular CA device. Typically, in broadcast systems, a group entitlement right of group key would be delivered to the CA device. Typically the group are users or customers who share a particular set of entitlements, e.g. HBO or Disney.

Current copy protection schemes allow the copying of CA scrambled content as "Copy Free". Yet the CA unscrambled content may or may not be copiable based on the Copy Protection status of the content. A content provider may choose to mark certain types of CA unscrambled content as "Copy Never" where there can never be copying of the CA unscrambled content. In such an approach, the content stored and kept in CA scrambled format. There are a number of problems with such a copy protection approach.

First, if the content is locally scrambled with a unique CA key or unique access right in a particular CA device, then it is difficult to play back the content in another CA device located elsewhere. As an example, in a home environment, if a set-top box has a unique CA key or access right to de-scramble the content delivered by a cable service provider, then only that particular set-top box can provide access to the content. Other set-top boxes located elsewhere (e.g., other rooms, or in the car, or portable devices like a Walkman) cannot access the content.

Second, if the CA device with a unique CA key or unique access right fails to work for any reason, then the content stored with, or received by, that device may not be retrievable. A user's entire archive of movies, music, and other content stored with that unique CA key or unique access right of a particular CA device nay be lost. These and other problems create inconveniences and frustrations for the user, and may also limit the services provided by the content provider.

Therefore, there is a need for a more flexible for handling copy protected content to accommodate multiple access devices.

SUMMARY

The present invention is a method and apparatus for providing copy protection for a content. A descrambler descrambles the content delivered by a content provider using a local key. A key generator is coupled to the descrambler to generate the local key from a programmable user key according to an authorization code provided by the content provider.

In one embodiment, each user is assigned a user key which may be programmed into various devices owned by that user. The user key is used to descramble locally stored content. Scrambled content may be copied since only the devices owned by the user, containing the user key, can unscramble the content. The content may be delivered to the user or household scrambled under the user key. Alternatively, the content may also be delivered under a group entitlement or broadcast key, however when stored locally, the content is reprocessed with the user key.

BRIEF DESCRIPTION OF THE DRAWINGS

The features and advantages of the present invention will become apparent from the following detailed description of the present invention in which.

DESCRIPTION

The present invention is a method and apparatus to provide copy protection for a content. The content is provided by a content provider. A descrambler descrambles the scrambled content using a local key. In one embodiment, each user is assigned a user key which may be programmed into various devices owned by that user. The user key is used to descramble locally stored content. Scrambled content may be copied since only the devices owned by the user, containing the user key, can unscramble the content. The content may be delivered to the user or household scrambled under the user key. Alternatively, the content may also be delivered under a group entitlement or broadcast key, however when stored locally, the content is reprocessed with the user key.

A key generator is coupled to the descrambler to generate the local key from a user key according to an authorization code provided by the content provider. In one embodiment of the invention, a communication interface provides the authorization code to the key generator via a communication channel. The technique allows a user to use his or her user key to access a scrambled content with authorized conditional access (CA) devices.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown where unnecessary for an understanding of the present invention. For example, specific details are not provided as to whether the method is implemented in a station as a software routine, hardware circuit, firmware, or a combination thereof.

Embodiments of the invention may be represented as a software product having program code segments to perform the necessary tasks corresponding to the elements of the present invention. The program or code segments can be stored in a processor readable medium or transmitted by a computer data signal embodied in a carrier wave, or a signal modulated by a carrier, over a transmission medium. The processor or machine readable medium may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The processor or machine readable medium may contain various sets of instructions, code sequences, configuration information, or other data. Those of ordinary skill in the art will appreciate that other instructions and operations necessary to implement the described invention may also be stored on the machine-readable medium. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 1:
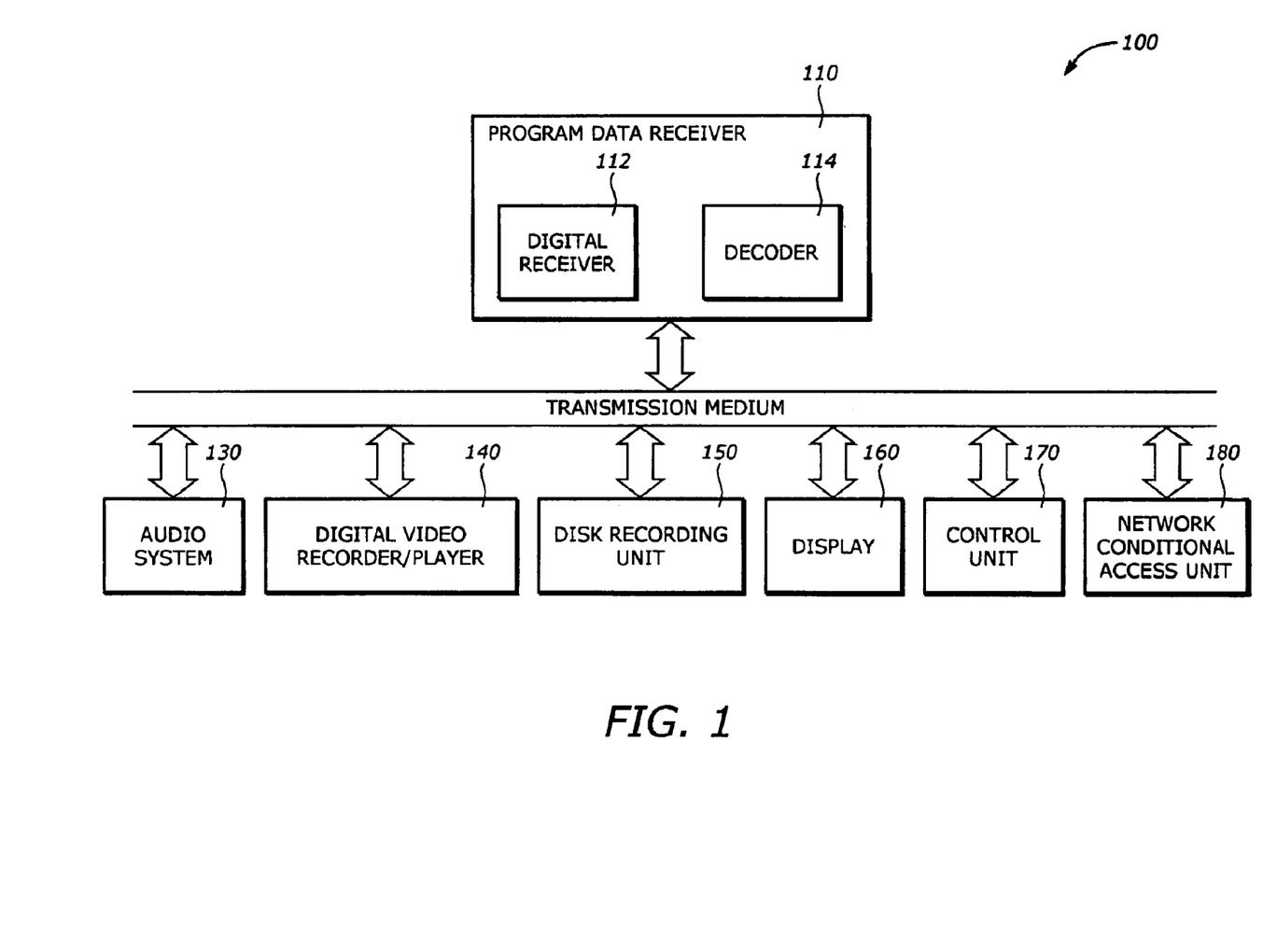
FIG. 1 is a diagram illustrating a system in which one embodiment of the invention can be practiced.

FIG. 1 is a diagram illustrating a system 100 in which one embodiment of the invention can be practiced.

The system 100 includes a program data receiver 110, a transmission medium 120, an audio system 130, a digital video recorder or player 140, a disk recording unit 150, a display 160, a control unit 170, and a network CA unit 180.

The program data receiver 110 includes a digital receiver 112 and a decoder 114. The digital receiver 112 receives digital bitstream or data including program data from one or more service providers. Such service or content providers may include terrestrial broadcasters, cable operators, direct broadcast satellite (DBS) companies, companies providing content for download via the Internet, book publisher, software companies distributing software products, or any similar content and/or service provider. The program data may include system information, entitlement control messages, entitlement management messages, content, and other data. System information may include information on program names, time of broadcast, source, method of retrieving and decoding, copy management commands that provide digital receivers and other devices that control how, when, and what program data may be replayed, retransmitted, copied, and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 112 such as rights and de-scrambling keys. As known, a decryption or de-scrambling key is generally a code that is required to restore the scrambled data, and may be a function of the rights granted. Finally, content in the program data may include audio and video data, which may be in s scrambled or encrypted or clear format. The decoder 114 receives the extracted program data from the digital receiver 112. The decoder 114 separates the system information from the content, decodes or decompresses the content to its original form. In one embodiment, the program data receiver 110 is a television set where the digital receiver 112 is a set-top box integrated therein, and the decoder 114 is a Motion Picture Experts Group (MPEG) decoder.

The transmission medium 120 operates to transmit control information and data including program data between the program data receiver 110 and other components in the system 100. The transmission medium 120 may include air, fiber optics, electronic and magnetic media, computer network connection, telephone connection, and any other communication media.

The audio system 130 is coupled to the transmission medium 130 to provide audio services. The audio system 130 may include speakers, an audio player/recorder such as a compact disk player, or other magneto-optical disc that may be used to play and/or record audio data. The digital video recorder/player 140 is coupled to the transmission medium 120 to provide video services. The digital video recorder/player 140 may be used to record analog or digital video, audio, and other data transmissions. In one embodiment, the digital video recorder/player 140 may be used to replay or record the program data received by the program data receiver 110 and transmitted over the transmission medium 120.

The disk recording unit 150 may also be coupled to the program data receiver 110 and other components via the transmission medium 120. The disk recording unit 150 may be a personal computer system, a stand-alone hard disk recording unit, or other disk recording device capable of recording analog or digital audio, video and data transmissions, including the program data received and transmitted by the program data receiver 110.

The display 160 may include a television display, a monitor display or other devices capable of processing and displaying video signals. In one embodiment, the display 160 is a digital television set. The control unit 170 may also be coupled to the transmission medium 120 to coordinate and control the operation of some or each of the components on the system 100, as well as other devices remotely coupled thereto.

The network conditional access (CA) unit 180 may also be coupled to the transmission medium 120. The network CA unit 180 operates to re-scramble program data with content in clear format such that the system 100 supports the simultaneous transmission of program data in clear and scrambled format. The network CA unit 180 may be a CA device that operates as a second CA device in a system embodiment where the program data receiver 110 operates as a master CA device.

Figure 2:
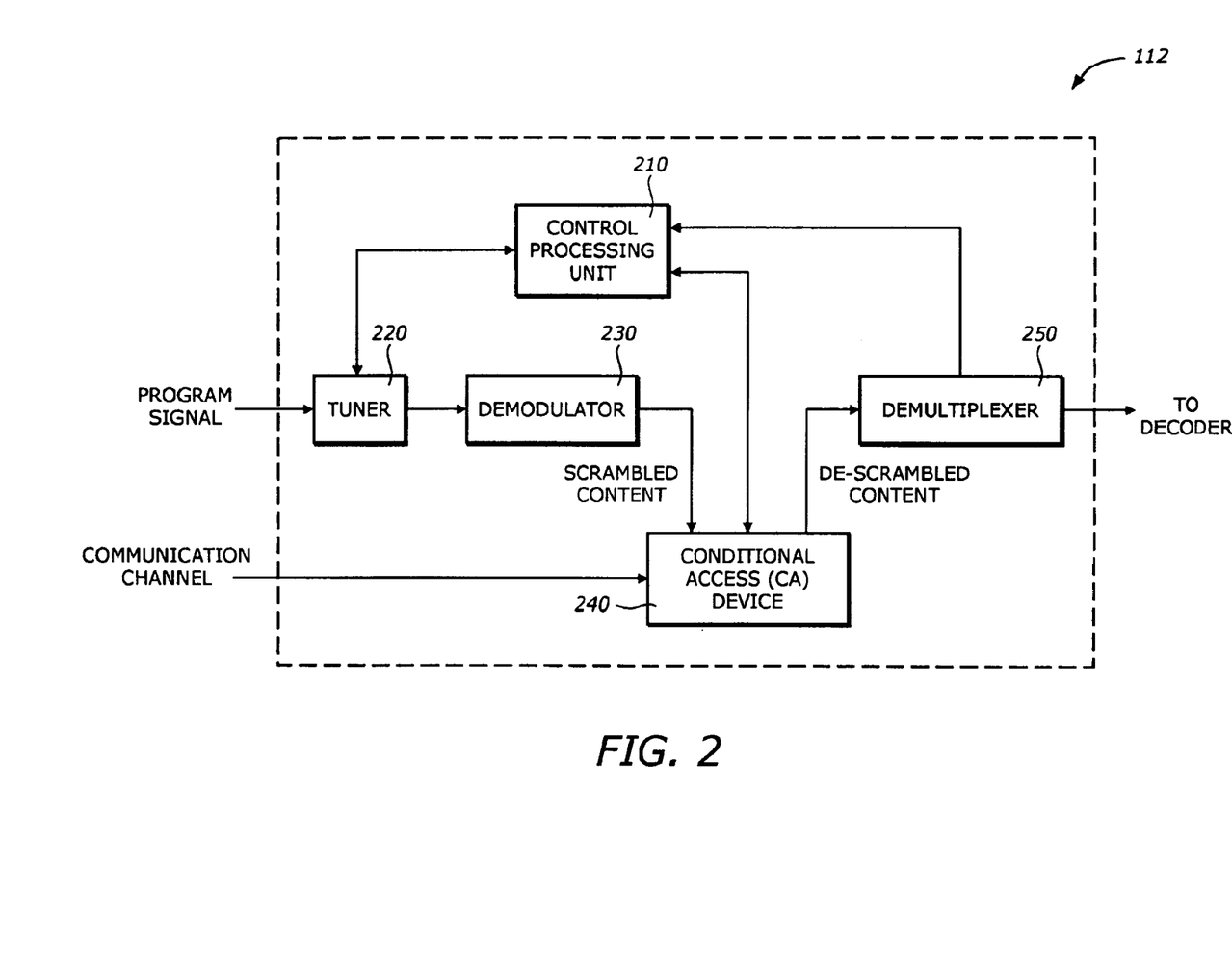
FIG. 2 is a diagram illustrating a digital receiver according to one embodiment of the invention.

FIG. 2 is a diagram illustrating a digital receiver 112 according to one embodiment of the invention. The digital receiver 112 includes a control processing unit 210, a tuner 220, a demodulator 230, a conditional access (CA) unit 240, and a demultiplexer 250.

The control processing unit 210 performs control functions for the tuner 220, the CA unit 240 and the demultiplexer 250. The control processing unit 210 may determine the frequency in which a channel is broadcast or otherwise transmitted. The control processing unit 210 may support a graphical user interface (GUI), such as electronic programming guide (EPG) to allow a user to navigate through various channels and program options to select a desired channel or program for viewing, listening, recording and the like. The control processing unit 210 may contain a copy protection manager that provides copy protection for multiple CA devices according to one embodiment of the present invention.

The tuner 220 selects a frequency of the signal received by the program data receiver 110 (in FIG. 1) under the control of the control processing unit 210. The tuner 220 processes, amplifies, digitizes, and generates a bitstream to the demodulator 230.

The demodulator 230 demodulates the bitstream received from the tuner 220 to provide the program data as originally transmitted. The type of demodulation performed by the demodulator 230 depends on the type of transmission as well as the modulation process used in the transmission process. Examples of the demodulation includes quadrature amplitude modulation (QAM) demodulation, quadrature phase shift key (QPSK) demodulation, and vestigial side band (VSB) demodulation. In addition, the demodulator 230 may perform error correction on the received bitstream.

The conditional access unit 240 may be integral or external to the digital receiver 112. The CA unit 240 provides conditional access to the program data as provided by the demodulator 230. The program data is typically scrambled using an access key. The CA unit 240 may be used in an external or split mode. In the external mode, the CA unit 240 de-scrambles the program data content and decrypts the keys externally; e.g., as is the case with the National Renewable Security System (NRSS) conditional access modules. In a split conditional access unit, the program data content is de-scrambled within the digital receiver 112, while the key decryption is done externally, e.g., via a smart card.

The demultiplexer 250 receives the de-scrambled or unscrambled content from the CA unit 240. The demultiplexer 250 separates the system information from the content in the program data, and according to one embodiment, parses the program data for packet identifiers that are associated with the system information, audio information, and video information, and then transmits the system information to the control processing unit 210 and the audio and video information to the decoder 114 (in FIG. 1).

Figure 3:
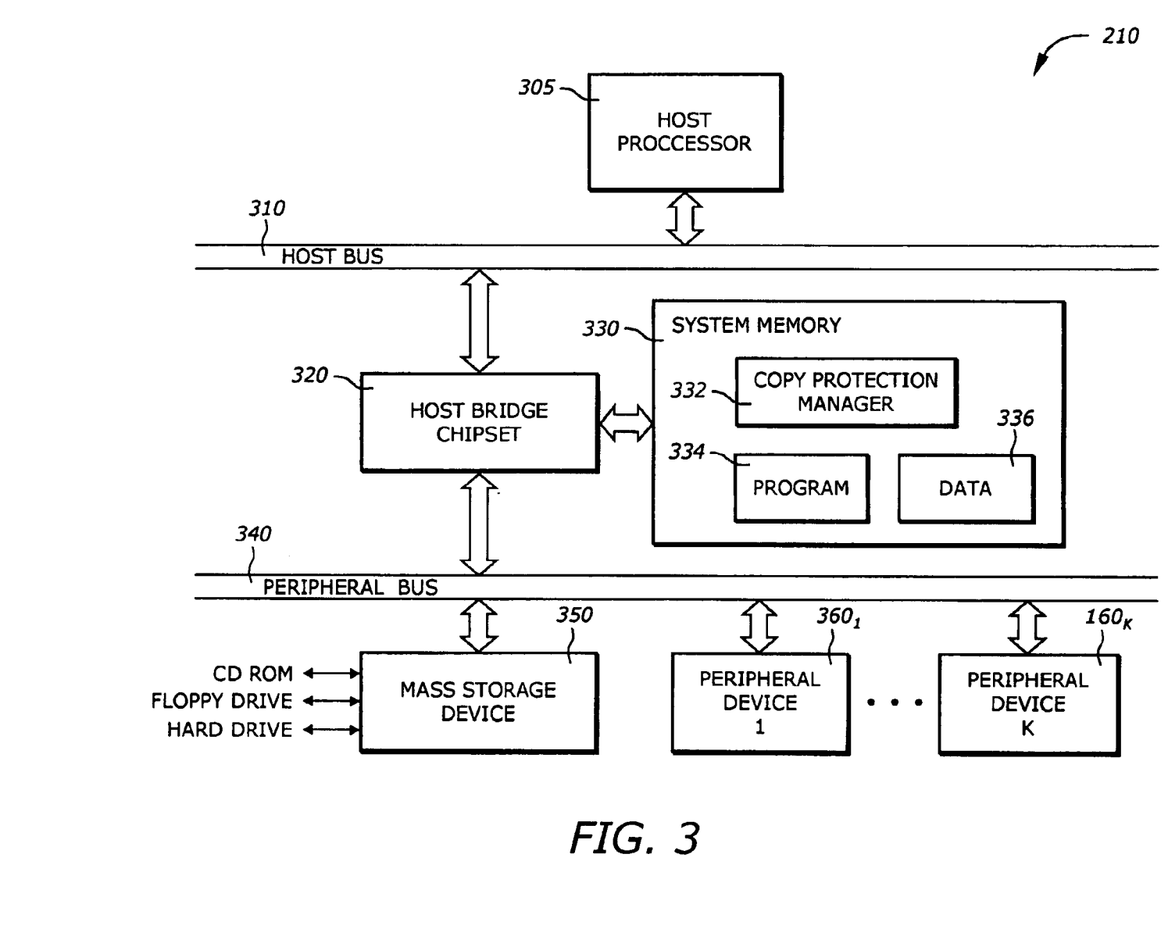
FIG. 3 is a diagram illustrating a control processor unit according to one embodiment of the invention.

FIG. 3 is a diagram illustrating a control processor unit 210 according to one embodiment of the invention. The control processor unit 210 includes a processor 305, a host bus 310, a host bridge chipset 320, a system memory 330, a peripheral bus 340, a mass storage device 350, and K peripheral devices $360_1$ to $360_K$. Although the control processor unit 210 is shown external to the conditional access unit 240 (in FIG. 2), it can be implemented as part of the CA unit 240.

The processor 305 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 320 includes a number of interface circuits to allow the host processor 305 access to the system memory 330 and the peripheral bus 340. The host bridge chipset 320 may include a memory controller and an I/O controller. The memory controller provides an interface to the system memory 330. The I/O controller provides control of I/O functions.

The system memory 330 represents one or more mechanisms for storing information. For example, the system memory 330 may include non-volatile or volatile memories. Examples of these memories include flash memory, read only memory (ROM), or random access memory (RAM). The system memory 330 contains a copy protection manager 332, a program 334 and a data 336. Of course, the system memory 330 preferably contains additional software (not shown), which is not necessary to understanding the invention.

The peripheral bus 340 provides bus interface to the mass storage device 350 and peripheral devices $360_1$ to $360_K$. In one embodiment, the peripheral bus 160 is the peripheral component interconnect (PCI) bus.

The mass storage device 350 include CD ROM, floppy diskettes, and hard drives. The mass storage device 350 stores non-volatile information such as programs or data. The mass storage device 350 provides a mechanism to read machine or processor readable media, including a computer program product comprising a computer usable medium having computer program code embodied therein to provide copy protection management. The peripheral devices $360_1$ to $360_K$ include other peripheral devices or controllers such as network interface device, printer controller, keyboard, mouse, tablet digitizer, etc.

Figure 4:
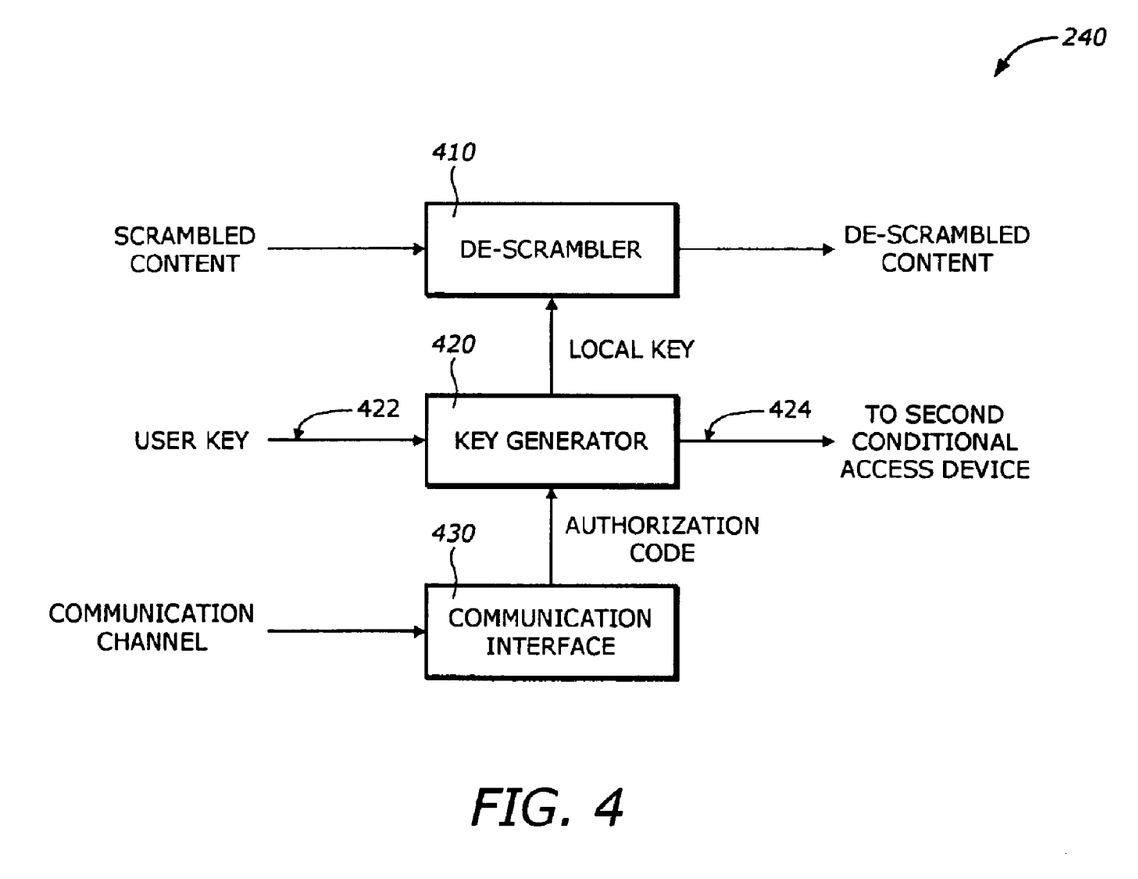
FIG. 4 is a diagram illustrating a conditional access unit according to one embodiment of the invention.

FIG. 4 is a diagram illustrating a conditional access unit 240 according to one embodiment of the invention. The CA unit 240 includes a de-scrambler 410, a key generator 420, and a communication interface 430.

The de-scrambler 410 receives the scrambled content, such as the bitstream provided by the demodulator 230 shown in FIG. 2, and de-scrambles the scrambled content to the clear format. The de-scrambler 410 performs descrambling or de-cryption using a local key provided by the key generator 420.

The key generator 420 receives a user key provided by the user or the content provider and generates the local key to the de-scrambler 410. The key generator 420 may be an interface circuit to interface to a communication channel to receive the user key downloaded from system at the site of the service provider or transferred from another or master CA unit.

According to one embodiment of the invention, the user obtains the user key from the service provider to have access to the scrambled content. The user key is programmable. The user is also granted a right to use the user key in multiple CA devices within his or her control. The granting of this right can be manifested by an authorization code.

The user can copy or re-generate the user key in a number of ways. In one embodiment, the user key is transferred from a master CA device to a second CA device by establishing a connection between the master and the second CA devices. In a second CA device, the key generator 420 has an interface to a connection port via line 422 to receive the user key transferred from a master CA device. In a master CA device, the key generator 420 therefore has an interface to a connection port via line 424 so that the user key can be re-generated for transfer to a second CA device. The transfer of the user key from a master CA device or from a user key transmitter (e.g., directly from the service provider) is permitted only if the receiving unit (e.g., the second CA device) has a proper authorization code. The user therefore can transfer his or her user key to any CA device under his or her control according to the right granted as provided by the authorization code.

The communication interface 430 provides the authorization code to the key generator 420 to allow the generation of the local key. The communication interface 430 receives the authorization code via a communication channel. The communication channel may be a return path of a cable connection, a telephone connection, or a network. The communication interface 430 may be a modem connection to connect directly to the service provider site. The authorization code may be obtained at the time a contract for service is executed between the user and the service provider, or subsequently when the user contacts the service provider for authorization. Alternatively, the user may register to the service provider as a registered owner of the CA device that has the right to access the scrambled content. Subsequently, the authorization code can be provided to the user if evidence of registered ownership is verified.

In one embodiment, the content may be embodied in a medium. The authorization code may accompany the medium at the time of purchase with a specified grant of right. In another embodiment, the authorization code may be entered directly by the user after contacting the service provider to obtain the authorization code. The user key may also be embedded in the medium embodying the scrambled digital content.

Figure 5:
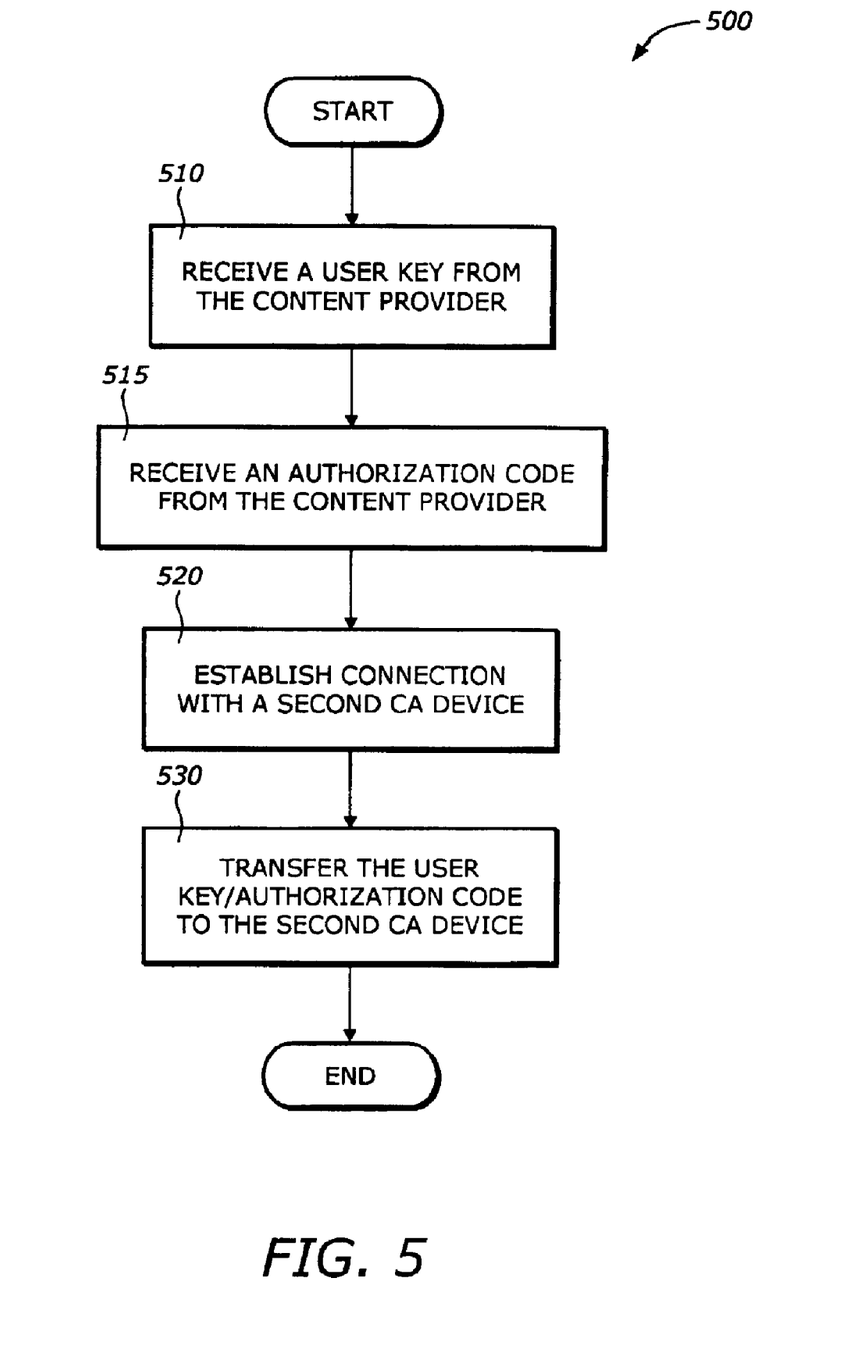
FIG. 5 is a flowchart illustrating a process for copy protection for a master CA device according to one embodiment of the invention.

FIG. 5 is a flowchart illustrating a process 500 for copy protection for a master CA device according to one embodiment of the invention.

Upon START, the process 500 receives a user key from the content provider (Block 510). The user key may be provided by any means. Then, the process 500 receives an authorization code from the content provider (Block 515). The authorization code grants the user a right to duplicate the user key for use in other CA devices.

Next, the process 500 establishes a connection with a second CA device (Block 520). The connection may be established via any means including electrical connections with connection ports configured for the transfer. Then, the process 500 transfers the user key and optionally the authorization code to the second CA device (Block 530). In one embodiment, the transfer is permitted when the authorization code matches the authorization code stored in the second CA device. Then the process 500 is terminated.

Figure 6:
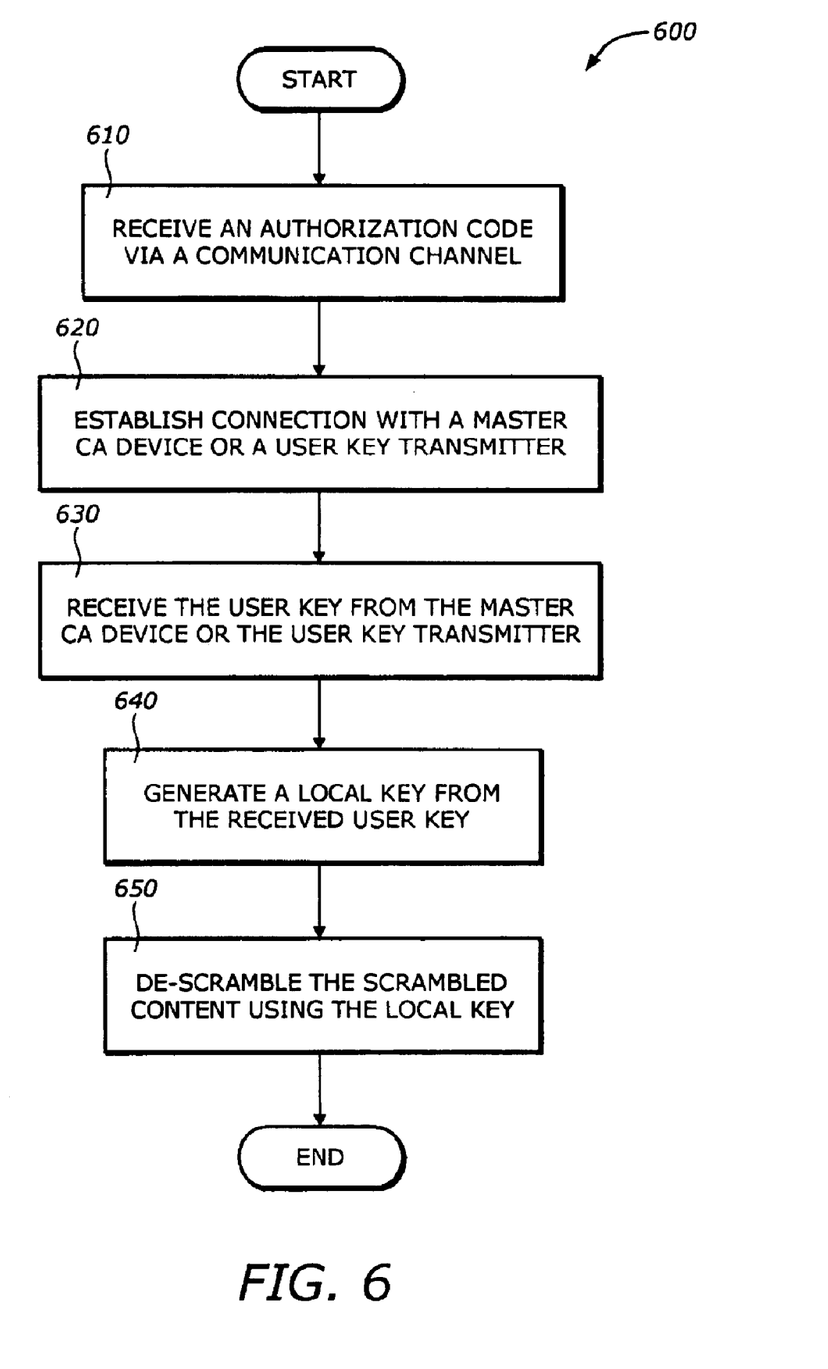
FIG. 6 is a flowchart illustrating a process for copy protection for a second CA device according to one embodiment of the invention.

FIG. 6 is a flowchart illustrating a process 600 for copy protection for a second CA device according to one embodiment of the invention.

Upon START, the process 600 receives an authorization code via a communication channel (Block 610). The authorization code may be obtained by the user via any means. The authorization code may be entered by the user as instructed by the content provider at the time a contract between the user and the content provider is executed. Then the process 600 establishes a connection with a master CA device or a user key transmitter (Block 620). The master CA device is a device that originally has a user key unique to the user. The user key transmitter may be any mechanism that can transfer the user key to the second device. Then, the process 600 receives the user key from the master CA device or the user key transmitter (Block 630). In one embodiment, the receipt of the user key is permitted only if the authorization code in the second CA device matches the authorization code in the master CA device or in the user key transmitter.

Next, the process 600 generates a local key from the received user key using the authorization code (Block 640). The local key as generated has the same effect as the original user key. Then, the process 600 de-scrambles the scrambled content using the local key (Block 650). The process 600 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to provide copy protection for content, the method comprising:
   receiving a first authorization code by a conditional access (CA) device;
   receiving a programmable user key by the CA device, provided the first authorization code is determined to match a second authorization code stored in the CA device;
   generating a local key based on the programmable user key and one of the first and second authorization codes; and
   descrambling the content using the local key.

2. The method of claim 1 further comprising receiving the user key from the content provider via a communication channel.

3. The method of claim 1 wherein the user key is embedded in a medium embodying the content and permitted to be used by the first CA device if the authorization code matches an authorization code stored within the first CA device.

4. The method of claim 1, wherein the authorization code in its entirety is entered by the user.

5. The method of claim 1, wherein the first authorization code is provided via a communication channel, the communication channel being a return path for one of a cable connection, a telephone connection and a network.

6. A method to provide copy protection for content, the method comprising:
   receiving an authorization code by a first conditional access (CA) device;
   permitting receipt of a programmable user key by the first CA device if the authorization code grants a right to transfer the user key to the first CA device, the user key is provided by a second conditional access (CA) device having the authorization code;
   generating a local key based on the user key and the authorization code; and
   descrambling the content delivered to the first CA device using the local key.

7. The method of claim 6, wherein a transfer of the user key to the first CA device occurs if the authorization code at the second CA device matches an authorization code stored within the first CA device.

8. A conditional access (CA) device comprising:
   a descrambler to descramble incoming content using a local key;
   a key generator coupled to the descrambler and adapted to receive a programmable user key when a first authorization code provided to the CA device matches a second authorization code stored within the CA device, the key generator to generate the local key based on the programmable user key and one of the first and second authorization codes; and
   a communication interface coupled to the key generator to receive the first authorization code via a communication channel.

9. The CA device of claim 8 wherein the communication interface, being one of a return path of a cable connection, a telephone connection and a network, further receives the user key from the content provider via the communication channel.

10. The CA device of claim 8 wherein the user key is provided by a master CA device having the first authorization code.

11. The CA device of claim 8 wherein the user key is embedded in a medium embodying the content.

12. The CA device of claim 8, wherein the first authorization code grants a user a right to duplicate the user key.

13. The CA device of claim 8, wherein the key generator is permitted access to the user key when the second authorization code matches the first authorization code stored at a master CA device.

14. A computer program product comprising:
   a computer usable medium having computer program code embodied therein to provide copy protection for a scrambled content, the computer program product having:
      a first program code of a first conditional access (CA) device to descramble the scrambled content using a local key;
      a second program code of the first CA device to generate the local key based on a programmable user key and an authorization code, the user key and authorization code being received from a separate source having the authorization code, provided that the authorization code permits receipt of the user key by the first CA device; and
      a third program code of the first CA device to receive the authorization code.

15. The computer program product of claim 14 further comprising a fourth program code to receive the user key via a communication channel, the communication channel being one of a return path of a cable connection, a telephone connection, and a network.

16. The computer program product of claim 14 wherein the user key is provided by the separate source being a master conditioned access (CA) device having the authorization code.

17. The computer program product of claim 14 wherein the user key is embedded in a medium embodying the content.

18. The computer program product of claim 14 further comprising a fourth program code to permit the user key to be accessed by the first CA device if the authorization code matches an authorization code pre-stored at the first CA device.

19. A conditional access (CA) device comprising:
   a descrambler to descramble incoming content using a local key;
   a key generator coupled to the descrambler and adapted to generate the local key based on a programmable user key and an authorization code, the key generator to transfer the programmable user key for utilization by a second CA device when an authorization code stored within the second CA device matches the authorization code; and
   a communication interface coupled to the key generator to receive the authorization code.

20. The CA device of claim 19 being in communication with the second CA device and adapted to transfer the authorization code to the second CA device.

* * * * *

UNITED STATES PATENT AND TRADEMARK OFFICE
CERTIFICATE OF CORRECTION

PATENT NO. : 6,912,513 B1
DATED : June 28, 2005
INVENTOR(S) : Brant L. Candelore It is certified that error appears in the above-identified patent and that said Letters Patent is hereby corrected as shown below:

<u>Column 1,</u>
Line 55, delete "Walkman" and insert -- Walkman®, registered trademark of Sony Corporation of Japan. --.

Signed and Sealed this

Fourth Day of April, 2006

JON W. DUDAS
*Director of the United States Patent and Trademark Office*